United States Patent
Bartik-Himmler et al.

(12) 
(10) Patent No.: US 6,627,006 B1
(45) Date of Patent: Sep. 30, 2003

(54) METHOD OF CONTROLLING A TREATMENT LINE

(75) Inventors: Ibolya Bartik-Himmler, Wuppertal (DE); Hans-Willi Kling, Wuppertal (DE); Werner Optiz, Langenfeld (DE); Jens Seemann, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/868,288

(22) PCT Filed: Oct. 7, 1999

(86) PCT No.: PCT/EP99/07527

§ 371 (c)(1),
(2), (4) Date: Sep. 17, 2001

(87) PCT Pub. No.: WO00/36183

PCT Pub. Date: Jun. 22, 2000

(30) Foreign Application Priority Data

Dec. 15, 1998 (DE) .......................................... 198 57 799

(51) Int. Cl.⁷ ............................................... C23C 22/00
(52) U.S. Cl. ....................... 148/241; 148/262; 148/500
(58) Field of Search ................................. 148/241, 262, 148/500

(56) References Cited

U.S. PATENT DOCUMENTS

| | | | |
|---|---|---|---|
| 4,026,737 A | 5/1977 | Takahari et al. | 148/6.14 R |
| 4,515,643 A * | 5/1985 | Knaster | 148/241 |
| 5,117,370 A | 5/1992 | DeCello et al. | 364/497 |
| 5,454,882 A * | 10/1995 | Asai et al. | 148/241 |

FOREIGN PATENT DOCUMENTS

| | | |
|---|---|---|
| AU | 720551 | 3/1998 |
| DE | 196 34 685 | 3/1998 |
| DE | 197 33 978 | 2/1999 |
| DE | 199 41 734 | 3/2001 |
| GB | 1 518 534 | 7/1978 |
| GB | 1 557 779 | 12/1979 |
| GB | 2 153 854 | 8/1985 |

* cited by examiner

*Primary Examiner*—Roy King
*Assistant Examiner*—Andrew L. Oltmans
(74) *Attorney, Agent, or Firm*—Stephen D. Harper; Glenn E. J. Murphy

(57) ABSTRACT

The invention relates to a method of controlling a treatment line. According to said method a) a correlation between one or several variable parameters of the chemical and/or physical processes of the treatment line and one or several characteristic values that are characteristic of the success of the treatment is established; rules are derived of this correlation that describe the dependence of the characteristic value or the characteristic values of the variable parameters; the correlation and/or the rules derived therefrom are stored in a control system for the treatment line; b) the one or the several characteristic value(s) is/are measured continuously or discontinuously; c) if said characteristic values deviate from a predetermined standard range of values, the/those variable parameter(s) that is/are most closely correlated with said characteristic value is/are modified in the direction which counteracts the deviation of the characteristic value or the characteristic values from the standard range.

11 Claims, No Drawings

METHOD OF CONTROLLING A TREATMENT LINE

CROSS-REFERENCE TO RELATED APPLICATIONS

This application is a U.S. National Stage application filed under 35 U.S.C. §371, claiming priority under 35 U.S.C. §§119 and 365 of International Application No. PCT/EP99/07527, filed Oct. 7, 1999, in the European Patent Office and DE 198 57 799.0, filed on Dec. 15, 1998, in the German Patent Office.

This invention relates to a process for controlling a treatment line, in which a workpiece is treated by chemical and/or physical processes. More particularly, the invention relates to processes in which the surface of the workpiece is chemically modified and/or coated. An example of such an application is the phosphating and the subsequent painting of metals, more particularly car bodies.

There are a large number of industrial processes in which a workpiece is treated by chemical and/or physical treatment processes. One objective of such treatment may be the chemical modification of the surface of the workpiece or its coating, for example its paint. A frequent objective of such processes is to give desired technical or aesthetic properties to the surfaces of the workpieces. One example of this are processes by which the surface of the workpieces may be protected from corrosion or by which the surface of the workpiece is given a desired, aesthetically attractive appearance.

In all these cases, the aim of treating the workpieces by chemical and/or physical processes is to produce certain technical or aesthetic effects. Whether the desired result is achieved depends on the substrate and on the selected parameters of the chemical and/or physical processes. The more precisely it is known which of the selectable parameters influence the desired result and how they do so, the parameters may be so adjusted that the desired result is achieved as reliably as possible or that the intended technical and/or aesthetic results of the treatment are as good as possible. In this connection, various constants which are considered to be characteristic of the intended result are defined. These constants correlate in different ways with one or more of the parameters of the chemical and/or physical processes by which the desired result is to be achieved. The practical knowledge of which parameters of the chemical and/or physical processes influence the result and in what way they do so is mostly of an empirical nature and has been acquired and improved in series of tests. Nevertheless, it is by no means guaranteed that all correlations between the parameters of the chemical and/or physical processes and the results attained by the treatment are now known sufficiently well and that these parameters are so adjusted that the desired result is achieved as optimally as possible. Accordingly, there is a need to refine the known correlations and to find new correlations. There is also a need, in the event of deviations of the obtained result from the intended result, to recognize those parameters of the chemical and/or physical processes and to be able to vary them in such a way that deviations of the obtained result from the intended result may be corrected as reliably as possible.

DESCRIPTION OF THE INVENTION

The present invention relates to a process for controlling a treatment line, in which a workpiece is treated by chemical and/or physical processes, characterized in that:

a) a correlation between one or more variable parameters of the chemical and/or physical processes of the treatment line and one or more constants which are characteristic of the outcome of the treatment is established, from it rules are derived which define the dependence of the constant or of the constants on the variable parameters and the correlation and/or the rules derived from it are stored in a control system for the treatment line;

b) the one or more constants characteristic of the outcome of the treatment are measured continuously or intermittently; and c) in the event of a deviation of these constants from a given range of set values or in the event of a significant tendency of these constants to move towards the limits of the range of set values, that/those variable parameter(s) of the chemical and/or physical processes of the treatment line which is/are most closely correlated with this constant is/are altered in accordance with the correlation established in step a) and/or the rules derived from it in that direction which counteracts the deviation of the constant or constants from the range of set values.

In this connection, it is of course advisable to alter only those parameters of the chemical and/or physical processes of the treatment line which do not adversely affect the other constants that are characteristic of the result. The chosen parameters of the chemical and/or physical processes are therefore those whose alteration is correlated as closely as possible with the diverging constant and whose alteration does not have a negative effect on other constants. This may be effected, for example, by a computer programme operating on the lines of an expert system.

The process according to the present invention is preferably carried out in such a way that, in step c), the alteration of the variable parameters of the chemical and/or physical processes of the treatment line takes place automatically without human intervention or that the control system for the process issues an appropriate recommendation to alter the variable parameters. The first alternative corresponds to fully automatic operation of the treatment line; in the second alternative, the operating personnel receive precise information as to which parameters are to be altered and in what way as the outcome of the process according to the invention.

The control system for the process according to the present invention is preferably installed so that it is "adaptive". Accordingly, the process according to the present invention is preferably started in such a way that, during the operation of the treatment line, the correlation between the variable parameters of the chemical and/or physical processes of the treatment line and one or more constants characteristic of the outcome of the treatment, and/or the rules derived from it, are adapted. Care is accordingly taken to ensure, firstly, that the control system receives—continuously or at specific times—information about the values of as many as possible of the parameters of the chemical and/or physical processes of the treatment line. This may be effected, for example, by automatically analyzing chemical processing liquids used during the treatment of the workpieces and passing the results of the analyses to the control system for the process according to the invention. This may of course also be done by manual input. Secondly, care is taken to ensure that the control system is informed as fully as possible about the outcome of the chemical and/or physical treatment, i.e. that it receives information about the values of as many as possible of the constants which are important to the result of the treatment. As far as possible, this is preferably also carried out automatically, but otherwise by manual data input. In this way, the system is placed in the position of being able continually to improve the correlation between the actual parameters and the results achieved and, if necessary, to find new correlations.

The manner in which the correlation between the individual variable parameters of the chemical and/or physical processes of the treatment line and the constants characteristic of the outcome of the treatment are stored in the control system and evaluated is basically unimportant. For example, the rules derived from the empirically discovered correlation may be expressed in the form of mathematical equations, as imprecise relations ("fuzzy logic")or in the form of model-free algorithms, such as neuronal networks. Suitable mathematical equation are, for example, multilinear regression methods or a partial least squares regression.

In one particular embodiment, the process according to the present invention may be carried out at a plant in which chemical modification and/or coating of the surface of the workpiece is carried out. A coating may consist, for example, of a single-layer or multi-layer paint structure. The chemical nature of the workpiece is initially not relevant. For example, a workpiece may be made of a natural substance, such as wood, of a plastic, of a ceramic material or of metal. For example, a plastic surface whose coating behavior is to be improved by chemical and/or physical treatment may be involved. A chemical treatment may consist, for example, in an oxidizing attack on the plastic surface. One example of a possible physicochemical process is a plasma treatment. Processes in which the metal surface is chemically modified may be involved, particularly in the case of metal workpieces. In this way, corrosion prevention may be improved and/or a desired surface appearance obtained. Examples of such processes are anodizing, chromating, a treatment using complex fluorides, optionally in combination with organic polymers, an alkaline passivation or layer-forming or non-layer-forming phosphating. After such a chemical modification, the metal surface may in addition be coated, for example by painting or enamelling. Depending on the type of metal and on the chemical treatment, an additional coating may be unnecessary. In one example of embodiment of the process according to the invention, the treatment line is a phosphating plant for the phosphating of metal surfaces before painting. In this application, phosphating is preferably carried out as so-called layer-forming phosphating in the form of zinc phosphating. In the course of this, a layer only a few $\mu$m in thickness consisting of crystalline zinc phosphate or of phosphates in which metals other than zinc (iron, nickel, manganese . . . ) are incorporated as cations is formed on the metal surface. Such phosphating processes are used, for example, in the metal industry, in vehicle manufacture and in the white goods industry.

In industrial plants of the type used, for example, in car production, the phosphating plant as a whole, besides having one or more phosphating zones, generally includes one or more cleaning zones and a pre-phosphating activation zone and, frequently, a post-passivation zone after phosphating. As a rule, intermediate rinsing with water is carried out between the individual treatment steps in the different treatment zones. Post-passivation in the post-passivation zone, which in favorable cases may even be dispensed with, is generally followed by painting. In car manufacture, the first painting step is normally cathodic electrophoretic coating. However, anodic electrophoretic coating may also be used or the first paint layer may be applied, without the assistance of current, by dipping the workpiece into the paint bath or by spray-application of the paint.

For example, layer-forming phosphating may be carried out in the phosphating zone by contacting the metal surface with an acidic aqueous phosphating solution containing 0.3 to 3 g/l zinc ions and 3 to 30 g/l phosphate ions. In the case of the acidic phosphating solutions having a pH in the range from about 2.8 to about 3.8, the phosphate ions are largely present as free phosphoric acid and as dihydrogen phosphate ions.

The zinc contents in the phosphating solution are preferably in the range from 0.4 to 2 g/l and in particular 0.5 to 1.5 g/l which is normal for low-zinc processes. The weight ratio of phosphate ions to zinc ions in the phosphating baths may vary within wide limits, providing it is in the range from 3.7 to 30. A weight ratio of 10 to 20 is particularly preferred.

In addition to the zinc ions and phosphate ions, the phosphating bath may contain other components of the type presently typical of phosphating baths.

It is preferable to use phosphate solutions containing additional mono- or di-valent metal ions which have been found from experience to have a favorable effect on paint adhesion and on the protection of the phosphate layers thus produced against corrosion. Accordingly, the phosphating solution preferably also contains one or more of the following cations:

0.1 to 4 g/l manganese(II),
0.1 to 2.5 g/l nickel(II),
0.2 to 2.5 g/l magnesium(II),
0.2 to 2.5 g/l calcium(II),
0.002 to 0.2 g/l copper(II),
0.1 to 2 g/l cobalt(II).

For example, in addition to zinc ions, the phosphate solution contains 0.1 to 4 g/l manganese ions and 0.002 to 2 g/l copper ions and not more than 0.05 g/l and in particular not more than 0.001 g/l nickel ions as additional cations. However, if it is intended to keep to conventional trication technology, phosphating baths which, besides zinc ions, contain 0.1 to 4 g/l manganese ions and in addition 0.1 to 2.5 g/l nickel ions may be used.

Besides the layer-forming divalent cations, phosphating baths generally also contain sodium ions, potassium ions and/or ammonium ions to adjust the free acid.

In the case of phosphating baths which are intended to be suitable for different substrates, it has become common practice to add free and/or complexed fluoride in quantities of up to 2.5 g/l total fluoride, of which up to 800 mg/l is free fluoride. In the absence of fluoride, the aluminium content of the bath should not exceed 3 mg/l. In the presence of fluoride, higher Al contents are tolerated through complexing providing the concentration of the non-complexed Al does not exceed 3 mg/l. The use of fluoride-containing baths is therefore advantageous when the surfaces to be phosphated consist at least partly of aluminium or contain aluminium. In such cases, it is favorable not to use complexed fluoride, but only free fluoride, preferably in concentrations of 0.5 to 1.0 g/l.

For the phosphating of zinc surfaces, it is not absolutely essential for the phosphating baths to contain so-called accelerators. For the phosphating of steel surfaces, however, the phosphating solution must contain one or more accelerators. Such accelerators are common in the prior art as components of zinc phosphating baths. Accelerators are substances which chemically bind the hydrogen formed as a result of the attack by the acid on the metal surface by being reduced themselves. Oxidizing accelerators also have the effect of oxidizing the iron(II) ions released by the attack on steel surfaces to the trivalent stage, so that they may precipitate as iron(III) phosphate. Examples of suitable accelerators are:

0.2 to 2 g/l m-nitrobenzene sulfonate ions, 0.1 to 10 g/l hydroxylamine in free or bound form, 0.05 to 2 g/l m-nitrobenzoate ions, 0.05 to 2 g/l p-nitrophenol, 1 to 70 mg/l hydrogen peroxide in free or bound form, 0.01 to 0.2 g/l nitrite ions, 0.05 to 4 g/l organic N-oxides, 0.1 to 3 g/l nitroguanidine.

In addition, nitrate ions in quantities of up to 10 g/l may be present as co-accelerators which can have a favorable effect, particularly in the phosphating of steel surfaces. In the phosphating of zinc-coated steel, *however, the phosphating solution preferably contains as little nitrate as possible. Nitrate concentrations of 0.5 g/l should preferably not be exceeded because, at higher nitrate concentrations, there is a danger of so-called "pinholing", i.e. the formation of white, crater-like voids in the phosphate layer.

Particularly preferred accelerators are hydrogen peroxide—from the perspective of environmental acceptability—and hydroxylamine—for the technical reasons of easier formulation of regenerating solutions. However, the use of these two accelerators together is not advisable because hydroxylamine is decomposed by hydrogen peroxide. If hydrogen peroxide in free or bound form is used as accelerator, concentrations of from 0.005 to 0.02 g/l of hydrogen peroxide are particularly preferred. The hydrogen peroxide may be added as such to the phosphating solution. However, hydrogen peroxide may also be added in bound form as compounds which yield hydrogen peroxide as a result of hydrolysis reactions in the phosphating bath. Examples of such compounds are persalts, such as perborates, percarbonates, peroxosulfates or peroxodisulfates. Other suitable sources of hydrogen peroxide are ionic peroxides, such as alkali metal peroxides.

Hydroxylamine may be used as the free base, as a hydroxylamine complex or in the form of hydroxylammonium salts. If free hydroxylamine is added to the phosphating bath or to a phosphating bath concentrate, it will be present largely as hydroxylammonium cation owing to the acidic character of these solutions. If it is used as hydroxylammonium salt, the sulfates and the phosphates are particularly suitable. In the case of the phosphates, the acid salts are preferred by virtue of their better solubility. Hydroxylamine or compounds thereof are added to the phosphating bath in such quantities that the calculated concentration of the free hydroxylamine is between 0.1 and 10 g/l, preferably between 0.2 and 6 g/l and more preferably between 0.3 and 2 g/l.

The effect of hydroxylamine as an accelerator may be assisted by the additional use of chlorate.

Other suitable accelerators are the organic N-oxides described in detail in German patent application DE-A-197 33 978.6. N-methylmorpholine N-oxide is a particularly preferred organic N-oxide. The N-oxides are preferably used in combination with co-accelerators, such as chlorate, hydrogen peroxide, m-nitrobenzene sulfonate or nitroguanidine. Nitroguanidine may also be used as sole accelerator, as described, for example, in DE-A-196 34 685.

Other parameters known to the expert for the control of phosphating baths are the pH and/or the free acid content and total acid content, generally expressed as a point count. The free acid point count means the consumption in ml of 0.1 N sodium hydroxide solution in order to titrate 10 ml of bath solution to a pH of 3.6. Similarly, the total acid point count indicates the consumption in ml to a pH of 8.2. Free acid values of between 0 and 1.5 points and total acid values of between about 15 and about 30 points are within the usual technical range.

Phosphating may be carried out by dipping, spraying or spray/dip processes. The contact times are in the usual range of between about 1 and about 4 minutes. The temperature of the phosphating solution is in the range from about 35 to about 70° C. and more particularly in the range from about 40 to about 60° C.

Accordingly, a large number of physical and chemical parameters may be selected to determine the outcome of phosphating and the protective effect of the paint subsequently applied. Physical parameters are in particular the temperature of the phosphating bath and the phosphating time. It is also important whether the parts to be phosphated are dipped in the phosphating solution or sprayed with the phosphating solution or whether the two processes are carried out one after the other in varying order. The adjustable chemical parameters are the composition of the phosphating solution and the free acid content and total acid content. Accordingly, the variable parameter or parameters may be selected from the temperature of the phosphating solution, the zinc concentration in the phosphating solution, the free acid content or total acid content in the phosphating solution, the concentration of one or more accelerators in the phosphating solution, the concentration of polyvalent metal ions other than zinc in the phosphating solution, the period for which the metal surface is in contact with the phosphating solution and the movement of the phosphating solution relative to the metal surface (bath agitation, spray or dip processes, spraying pressure).

However, the outcome of phosphating, expressed in constants, does not depend solely on the composition of the phosphating bath or on the physical phosphating parameters, but also on previous or subsequent treatment steps. For example, the composition of a pre-phosphating cleaning bath may be of significance to the outcome of phosphating. The same applies to the activating bath by which, as a rule, phosphating is immediately preceded. Equally, treatment with a post-passivation bath after phosphating and before painting may be of significance to constants, such as paint adhesion and corrosion resistance.

Pre-phosphating cleaning baths normally contain anionic and/or non-ionic surfactants together with alkaline builders in aqueous solution. Activating baths generally contain colloidal titanium phosphates in an aqueous solution of disodium hydrogen phosphate having a pH in the range from about 8 to about 9. Post-passivation baths based on chromates or chromic acid, on reactive polymers, such as amino-substituted polyvinylphenol derivatives, and on complex titanium fluorides and/or zirconium fluorides are known as are copper-containing post-passivation baths. The effect of these baths in connection with phosphating depends on their composition, the temperature, the treatment time and the type of treatment (spraying or dipping). Where there are intermediate rinsing steps, especially during the final rinse before cathodic dip coating, the purity of the final rinse water, expressed by its electrical conductivity, may also be of significance. In the process according to the invention, the correlation of these parameters with the constants characteristic of the outcome of the treatment may be determined and used for the control of these treatment steps. Accordingly one embodiment of the process according to the invention involves selecting the variable parameter or parameters from the temperature and/or composition of one or more cleaning baths before the phosphating zone, of an activating bath before the phosphating zone and/or of a post-passivation bath after the phosphating zone and/or the period for which these baths are in contact with the metal surface.

For the selected example of phosphating, there are a number of constants that are characteristic of the outcome of the treatment. The constants may be selected, for example, from the layer weight of the phosphate layer, the chemical composition of the phosphate layer, the current flow through the phosphate layer during cathodic polarisation, the thickness of an electrophoretic coating applied after phosphating, the adhesion of a paint applied after phosphating, the surface structure (roughness, undulation, gloss etc.) of a paint applied after phosphating and the susceptibility of the workpiece to corrosion after phosphating and painting.

Various methods are available for the measurement of these constants. The easiest way of determining layer weight is to detach the phosphate layer and to weigh a sample metal plate before and afterwards. The layer weight may be determined non-destructively, for example by infrared spectroscopy (characteristic vibrations of the phosphate groups). The chemical composition of the phosphate layer may be determined by conventional analysis, for example by atomic absorption spectroscopy, after its removal. After appropriate calibration, the proportion of selected elements in the phosphate layer may also be determined by X-ray fluorescence measurement. Measurement of the current flow through the phosphate layer during cathodic polarization is a quick way of estimating the corrosion resistance of the phosphate layer. The adhesion of a paint applied after phosphating may be determined by standard tests, such as Erichsen indentation, the T-bend test or a stone impact (chipping) test in a corrosive environment. Various corrodibility tests are available, including the salt-spray test, the alternating-climate test and the outdoor weathering test, generally carried out using metal test plates intentionally damaged by scoring.

If the constants cannot be determined on-line and automatically in the production process and passed to the control system for the process, they have to be determined separately and the results have to be fed manually (locally or at a remote location) into the control system.

At the beginning of the process according to the invention, it is of course necessary to preset starting values for the parameters of the chemical and/or physical processes. These starting values may come from previously determined correlations. However, it is also possible to take starting values which are known from the prior art for the respective treatment process or which are known from experience. The process according to the invention is then used to refine these starting parameters in the course of the process in such a way that optimal values are obtained for the relevant constants. In this connection, certain parameters may be preset to vary only within limits to be predetermined.

The results of the measurements of the one or more constants carried out in step b) and/or the measures taken in step c) are preferably recorded on a data carrier during the process according to the invention. They are then available for purposes of quality control and for checking the correlations with optionally other procedures than those used in the process according to the invention. Recording on a data carrier may take place locally, i.e. at the place where the process according to the invention is carried out. However, the data may also be transmitted to or directly fed in—continuously, periodically or in response to a request—at a remote location which may even be outside the production plant in which the chemical and/or physical process takes place. For example, this remote location may be at the premises of the manufacturer of the treatment solutions used in the process according to the invention. In this way, the manufacturer is regularly updated with information on the production process, for example on the values of the variable parameters of the chemical and/or physical processes of the treatment line, without any need for personnel to remain on site at the treatment line. In this connection, it is also preferred to arrange for the limiting values of the parameters, within which variations may be made automatically during the process according to the invention, or the ranges of set values obtained from the correlation in step a) to be reset locally or from a remote location.

The process according to the invention has the advantage that the values of the chemical and/or physical parameters of the treatment line are automatically adapted whenever the constants under consideration change, for example following a change of substrate. Through the process according to the invention, the values of the parameters are regulated in such a way that they are optimal for the respective substrate present. Manual intervention is either not necessary at all for this purpose or may be restricted to setting new limits for the permitted ranges of values of the individual parameters within which the ranges of set values may be adjusted by the process according to the invention.

EXAMPLE

The process according to the present invention was tested at a phosphating line of the type normally used in car manufacture. Car bodies are first cleaned in three baths, then activated, phosphated, post-passivated, primed with a cathodically depositable electrophoretic coating and then coated with filler and painted.

The following constants were selected for the effectiveness of this treatment chain:

1. chipping value in the VW test (K value: best value, K = 1; worst value, K = 10),
2. paint creepage to DIN 53167 after 10 one-week test cycles with a complete paint structure,
3. paint thickness of the complete paint structure,
4. CEC thickness = thickness of the cathodic electrophoretic coating for preset electrical deposition parameters.

Variable Parameters: (Set Values in Brackets)
Cleaning Baths and Activation Bath (="Pretreatment" Before Phosphating):

| | |
|---|---|
| Bath 1 | alkalinity of the first cleaning bath (in mol. equivalents; set value: 80–110) |
| Bath 2 | alkalinity of the second cleaning bath (in mol. equivalents; set value: 80–110) |
| Bath 3 | alkalinity of the third cleaning bath (in mol. equivalents; set value: 175–185) |
| Active | conductivity of the activation bath in $\mu S/cm^2$ (as a measure of cleaning solution carried over) |

Phosphating Parameters (Including Post-passivation):

| | |
|---|---|
| T.A. | total acid (23–28 points) |
| F.A. | free acid (0.7–1.1 points) |
| Zn | zinc concentration in the phosphating bath (3.0–3.7 points, corresponding to 1–1.2 g/l) |
| HAS | concentration of the accelerator hydroxylammonium sulfate in the phosphating bath (2–3.5 g/l) |

-continued

| | |
|---|---|
| Cr(VI) | concentration in the post-passivation bath (5.0–7.0 g/l) |

Parameters of the CEC Bath (Cathodic Dip Coating):

| | |
|---|---|
| pH | pH |
| Con | conductivity in the CEC bath in $\mu S/cm^2$ |
| TSC | total solids content in wt. % (19–20) |
| PBR | pigment binder ratio (0.57) |
| MEQ | milliequivalents of acid (45–55) |

| | Pretreatment | | | |
|---|---|---|---|---|
| Parameter/Target value | Bath 1 | Bath 2 | Bath 3 | Active |
| K value | | | | |
| Creepage | | | | |
| Thickness | | | 0.6 | 0.03 |
| Thickness CEC | | | | |

| | Phosphating | | | | |
|---|---|---|---|---|---|
| Parameter/Target value | T.A. | F.A. | Zn | HAS | CrVI |
| K value | | | −6.4 | | |
| Creepage | 0.2 | | | 0.7 | |
| Thickness | | | 59.0 | | |
| Thickness CEC | | | −5.3 | | |

| | CEC | | | | |
|---|---|---|---|---|---|
| Parameter/Target value | pH | Con | TSC | PBR | MEQ |
| K value | | | | | |
| Creepage | | | | | |
| Thickness | | | | | |
| Thickness CEC | −9.5 | | | 27.9 | |

The correlation Table shows the correlation matrix between chemical parameters and constants investigated in the event of variations in the values of the chemical parameters such as occur with time in an industrial automotive phosphating line. The correlation was determined by the method of multilinear regression and significance assessment by "anova" (=analysis of variance). Significant regression coefficients are shown in the Table.

Thus, the K value correlates negatively with the zinc concentration, i.e. a high zinc concentration in the phosphating bath results in the desired lower values of the K value. By contrast, paint creepage correlates in particular with the values for the total acid and for the concentration of the accelerator hydroxylamine in the phosphating bath. The total paint thickness is associated with the zinc content of the phosphating bath and otherwise correlates with the parameters Bath 3 and Active. Unlike the thickness of the total paint structure, the thickness of the CEC layer correlates negatively with the zinc concentration in the phosphating bath and otherwise with pH and PBR in the CEC bath.

What is claimed is:

1. A treatment line process comprising treating a workpiece by one or more chemical and/or physical processes, said processes having one or more variable parameters and one or more constants, said constants defining an outcome of the treatment upon the workpiece and having set values with limits defining a desired outcome of the treatment, said process further comprising the steps of:

a) establishing a correlation or set of correlations between one or more of the variable parameters of the chemical and/or physical processes of the treatment line and the one or more constants that define the outcome of the treatment, deriving rules that define the correlation or correlations between the one or more constants and the one or more variable parameters, and storing the correlation or correlations and/or the rules derived from them in a control system for the treatment line;

b) continuously or intermittently measuring the one or more constants that define the outcome of the treatment; and c) where one or more of the measured constants approach or deviate from the limits of their respective set values, altering one or more of the correlations established and/or the rules derived in step a) to return or maintain the one or more of the measured constants that are approaching or deviating from the limits of their respective set values to or within the limits of their respective set values, wherein the altering of the one or more correlations and/or rules take place automatically without human intervention or wherein the control system for the process issues a recommendation to alter the one or more correlations and/or rules, and wherein the one or more correlations and/or rules are altered by one or both of a multilinear regression or partial least squares regression method.

2. The process of claim 1, wherein the rules derived from the correlation or correlations between the one or more variable parameters of the chemical and/or physical processes of the treatment line and the one or more constants defining the outcome of the treatment are expressed in the form of mathematical equations, as imprecise relations, or in model-free algorithms.

3. The process of claim 1, wherein the treatment of the workpiece comprises a chemical modification and/or a coating of the surface of the workpiece.

4. The process of claim 1, wherein the treatment line is a phosphating line for the phosphating of metal surfaces before painting.

5. The process of claim 4, wherein the phosphating line comprises one or more phosphating zones and one or more of a cleaning zone, an activation zone, or a post-passivation zone.

6. The process of claim 5, wherein layer-forming phosphating is carried out in the phosphating zone by contacting the metal surface with an acidic aqueous phosphating solution containing 0.3 to 3 g/l zinc ions and 3 to 30 g/l phosphate ions.

7. The process of claim 6, wherein the variable parameter or parameters comprise one or more of phosphating solution temperature, zinc concentration in the phosphating solution, pH of the phosphating solution, free acid content of the phosphating solution, total acid content of the phosphating solution, concentration of one or more accelerators in the phosphating solution, concentration of polyvalent metal ions other than zinc in the phosphating solution, contact time between the metal surface and the phosphating solution, and movement of the phosphating solution relative to the metal surface.

8. The process of claim 5, wherein the variable parameter or parameters are selected from temperature and/or composition of one or more cleaning baths before the phosphating zone, of an activation bath before the phosphating zone and/or of a post-passivation bath after the phosphating zone and/or from contact time between any of these baths and the metal surface.

9. The process of claim 5, wherein the one or more constants defining the outcome of the treatment comprise one or more of the layer weight of the phosphate layer, the chemical composition of the phosphate layer, the current flow through the phosphate layer during cathodic polarisation, the thickness of an electrophoretic coating applied after phosphating, the adhesion of a paint applied after phosphating, the surface structure of a paint applied after phosphating, and the susceptibility of the workpiece to corrosion after phosphating and painting.

10. The process of claim 1, wherein the measuring of the one or more constants in step b) and/or the altering in step c) of the one or more correlations established and/or the rules derived in step c) are recorded on a data carrier.

11. The process of claim 1, wherein the limits of the set values of the parameters are varied or reset automatically during the process locally or from a remote location.

* * * * *